(12) United States Patent
Dagher et al.

(10) Patent No.: US 9,964,097 B2
(45) Date of Patent: May 8, 2018

(54) FLOATING WIND TURBINE SUPPORT SYSTEM

(71) Applicant: University of Maine System Board of Trustees, Bangor, ME (US)

(72) Inventors: Habib J. Dagher, Veazie, ME (US); Anthony M. Viselli, Bangor, ME (US)

(73) Assignee: University Of Maine System Board Of Trustees, Bangor, ME (US)

( * ) Notice: Subject to any disclaimer, the term of this patent is extended or adjusted under 35 U.S.C. 154(b) by 276 days.

(21) Appl. No.: 15/023,839

(22) PCT Filed: Sep. 24, 2014

(86) PCT No.: PCT/US2014/057236
§ 371 (c)(1),
(2) Date: Mar. 22, 2016

(87) PCT Pub. No.: WO2015/048147
PCT Pub. Date: Apr. 2, 2015

(65) Prior Publication Data
US 2016/0230746 A1 Aug. 11, 2016

Related U.S. Application Data

(60) Provisional application No. 61/881,806, filed on Sep. 24, 2013.

(51) Int. Cl.
*F03D 11/04* (2006.01)
*F03D 9/00* (2016.01)
(Continued)

(52) U.S. Cl.
CPC .............. *F03D 13/25* (2016.05); *B63B 1/107* (2013.01); *B63B 5/20* (2013.01); *B63B 9/065* (2013.01);
(Continued)

(58) Field of Classification Search
CPC . F03D 1/06; F03D 7/043; F03D 13/10; F03D 13/22; F03D 13/25; E02B 17/027;
(Continued)

(56) References Cited

U.S. PATENT DOCUMENTS 7,612,462 B2 * 11/2009 Viterna ................... B63B 21/50
290/42
7,993,107 B2 * 8/2011 Gevers .................... F03D 13/10
248/163.1
(Continued)

FOREIGN PATENT DOCUMENTS

JP 2004291702 A 10/2004

OTHER PUBLICATIONS

European Search Report, Application No. 14847463.8, dated May 3, 2017.
(Continued)

*Primary Examiner* — Igor Kershteyn
(74) *Attorney, Agent, or Firm* — MacMillan, Sobanski & Todd, LLC

(57) ABSTRACT

A semi-submersible wind turbine platform is capable of floating on a body of water and supporting a wind turbine, and includes a keystone. At least three bottom beams extend radially outward of the keystone, and a center column extends perpendicularly from an upper surface of the keystone, a first axial end of the center column attached to the keystone; the center column configured to have a tower attached to a second axial end thereof. One of a plurality of outer columns extends perpendicularly from an upper surface of each bottom beam, wherein first axial ends of the outer columns are attached to a distal end of each bottom beam. One of a plurality of top beams extends between a second axial end of each outer column and a second axial end of the center column, wherein the top beams are
(Continued)

configured substantially not to resist bending moment of a tower attached to the center column.

22 Claims, 6 Drawing Sheets

(51) Int. Cl.
| | |
|---|---|
| B63B 22/20 | (2006.01) |
| F03D 13/25 | (2016.01) |
| B63B 1/10 | (2006.01) |
| B63B 35/44 | (2006.01) |
| F03D 13/20 | (2016.01) |
| E02B 17/02 | (2006.01) |
| F03D 1/06 | (2006.01) |
| F03D 7/04 | (2006.01) |
| B63B 39/03 | (2006.01) |
| F03D 13/10 | (2016.01) |
| B63B 5/20 | (2006.01) |
| B63B 9/06 | (2006.01) |
| B63B 1/12 | (2006.01) |
| E02B 17/00 | (2006.01) |

(52) U.S. Cl.
CPC .............. *B63B 35/44* (2013.01); *B63B 39/03* (2013.01); *E02B 17/027* (2013.01); *F03D 1/06* (2013.01); *F03D 7/043* (2013.01); *F03D 13/10* (2016.05); *F03D 13/22* (2016.05); *B63B 2001/128* (2013.01); *B63B 2035/446* (2013.01); *E02B 2017/0091* (2013.01); *F05B 2240/93* (2013.01); *Y02E 10/721* (2013.01); *Y02E 10/725* (2013.01); *Y02E 10/727* (2013.01)

(58) Field of Classification Search
CPC ... E02B 2017/0091; B63B 1/107; B63B 5/20; B63B 9/065; B63B 2001/128; B63B 2035/446; B63B 35/44; B63B 39/03; F05B 2240/93; Y02E 10/721; Y02E 10/725; Y02E 10/727

See application file for complete search history.

(56) References Cited

U.S. PATENT DOCUMENTS

| | | | |
|---|---|---|---|
| 8,118,538 B2* | 2/2012 | Pao | B63B 21/50 415/115 |
| 8,622,011 B2* | 1/2014 | Jahnig | B63B 1/107 114/267 |
| 8,657,534 B2* | 2/2014 | Jahnig | B63B 35/44 405/223.1 |
| 8,662,793 B2* | 3/2014 | Wong | F03D 9/257 114/264 |
| 8,752,495 B2* | 6/2014 | Jahnig | B63B 1/04 114/264 |
| 8,893,638 B2* | 11/2014 | Thieffry | B63B 9/065 114/264 |
| 9,415,842 B2* | 8/2016 | Thieffry | B63B 35/44 |
| 2006/0165493 A1 | 7/2006 | Nim | |
| 2010/0150664 A1 | 6/2010 | Jakubowski | |
| 2011/0037264 A1 | 2/2011 | Roddier et al. | |
| 2011/0148115 A1 | 6/2011 | Roznitsky et al. | |
| 2011/0155038 A1 | 6/2011 | Jahnig et al. | |
| 2012/0103244 A1 | 5/2012 | Gong et al. | |
| 2012/0294681 A1 | 11/2012 | Wong et al. | |
| 2013/0224020 A1 | 8/2013 | Dagher et al. | |
| 2013/0233231 A1 | 9/2013 | Dagher et al. | |

OTHER PUBLICATIONS

PCT International Search Report, Application No. PCT/US2014/057236, dated Jan. 8, 2015.

* cited by examiner

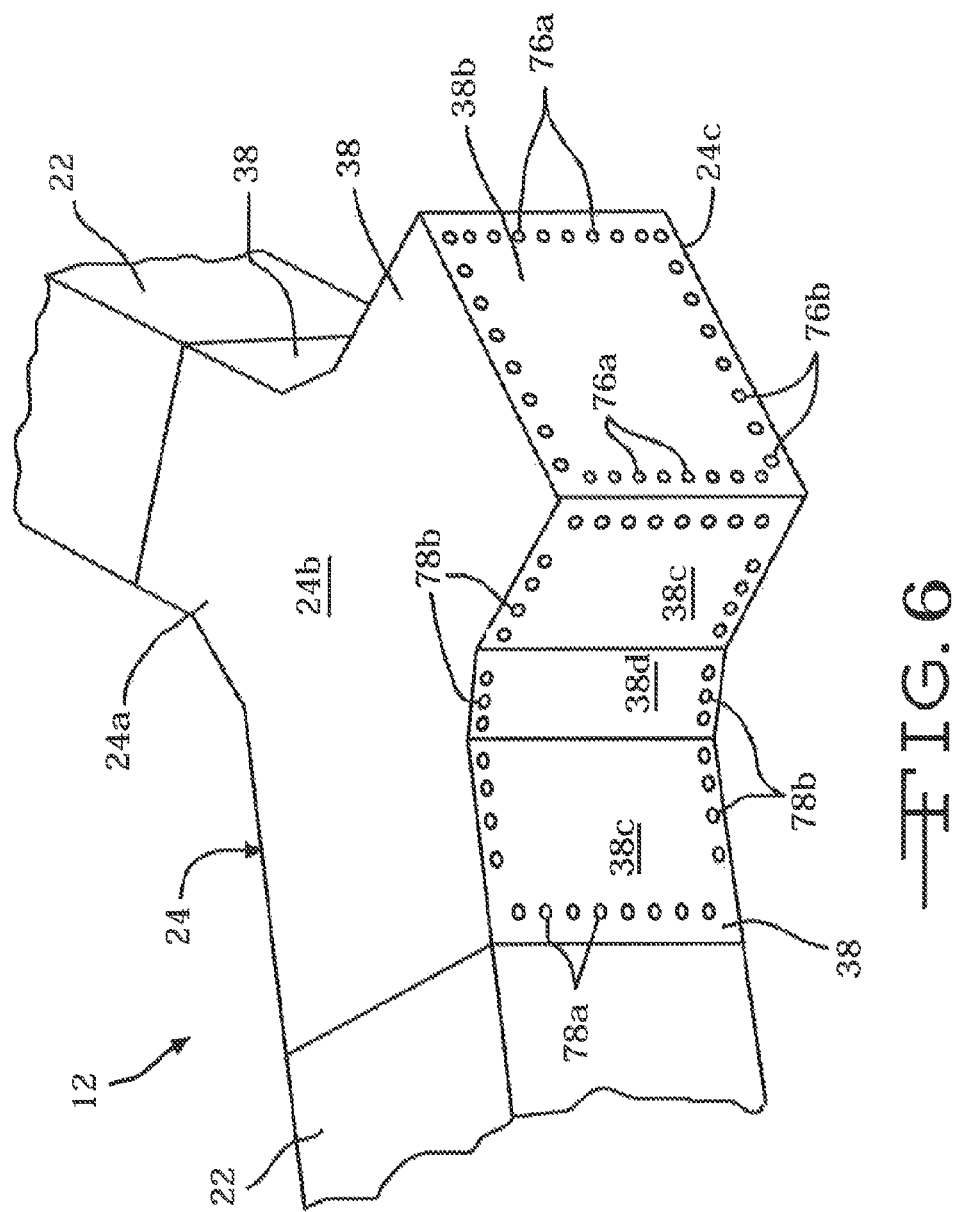

US 9,964,097 B2

FLOATING WIND TURBINE SUPPORT SYSTEM

BACKGROUND

This invention relates in general to wind turbine support systems. In particular, this invention relates to an improved floating wind turbine support system and a method for assembling such a floating wind turbine support system.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations is relatively expensive, and can only be accomplished at relatively shallow depths, such as a depth of up to about 25 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are not likely economically feasible. This limitation has led to the development of floating platforms for wind turbines.

Known floating wind turbine platforms are formed from steel and are based on technology developed by the offshore oil and gas industry. Other examples of floating wind turbine platform are described in PCT Application No. PCT/US2011/059335, filed Nov. 4, 2011 (published as PCT Publication No. WO2012061710 A2 on May 10, 2012), and U.S. patent application Ser. No. 13/863,074, filed Apr. 15, 2013 (published as U.S. Patent Application Publication No. 2013/0233231 A1 on Sep. 12, 2013), the disclosures of both are incorporated herein by reference. There remains however, a need to provide an improved floating wind turbine support system.

SUMMARY

This application describes various embodiments of a semi-submersible wind turbine platform. In one embodiment, a semi-submersible wind turbine platform is capable of floating on a body of water and supporting a wind turbine, and includes a keystone. At least three bottom beams extend radially outward of the keystone, and a center column extends perpendicularly from an upper surface of the keystone, a first axial end of the center column attached to the keystone; the center column configured to have a tower attached to a second axial end thereof. One of a plurality of outer columns extends perpendicularly from an upper surface of each bottom beam, wherein first axial ends of the outer columns are attached to a distal end of each bottom beam. One of a plurality of top beams extends between a second axial end of each outer column and a second axial end of the center column, wherein the top beams are configured substantially not to resist bending moment of a tower attached to the center column.

Various advantages of the invention will become apparent to those skilled in the art from the following detailed description, when read in view of the accompanying drawings.

BRIEF DESCRIPTION OF THE DRAWINGS

FIG. 1A is an enlarged elevational view of portion of an alternate embodiment of the floating wind turbine platform illustrated in FIG. 1, showing a vertical-axis wind turbine.

FIG. 6 an enlarged perspective view of the keystone illustrated in FIG. 2.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

The embodiments of the invention disclosed below generally provide improvements to various types of floating wind turbine platforms, such as spar buoy type platforms, tension leg type platforms, and semi-submersible type platforms. The invention includes an improved floating wind turbine support system or platform, improved methods of constructing the components of the improved floating wind turbine support system with materials selected to reduce the overall weight, cost, and performance of the floating wind turbine support system, and a method of assembling the improved floating wind turbine support system.

Figure 1:
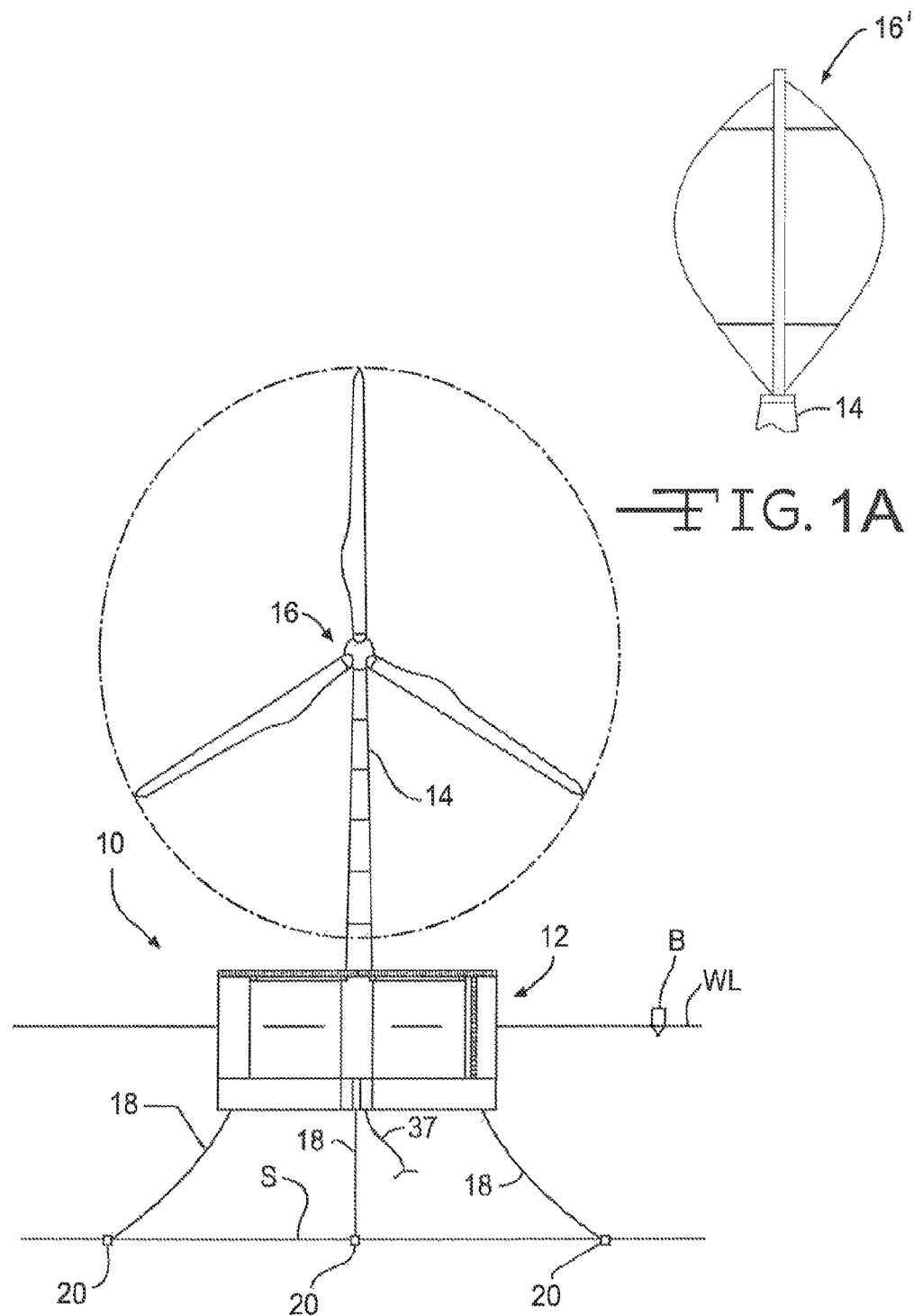
FIG. 1 is an elevational view of an improved floating wind turbine platform according to this invention.

As used herein, the term parallel is defined as in a plane substantially parallel to the horizon. The term vertical is defined as substantially perpendicular to the plane of the horizon Referring to the drawings, particularly to FIG. 1, a first embodiment of a floating composite wind turbine support system or platform 10 is shown anchored to the seabed S. The illustrated floating wind turbine platform 10 includes a foundation 12 that supports a tower 14, described below in detail. The tower 14 supports a wind turbine 16. The foundation is semi-submersible, and is structured and configured to float, semi-submerged, in a body of water. Accordingly, a portion of the foundation 12 will be above water when the foundation 12 is floating in the water. As shown, a portion of the foundation 12 is below the waterline WC. As used herein, the waterline is defined as the approximate line where the surface of the water meets the floating wind turbine platform 10. Mooring lines 18 may be attached to the floating wind turbine platform 10 and further attached to anchors, such as the anchors 20 in the seabed S to limit to movement of the floating wind turbine platform 10 on the body of water.

Figure 2:
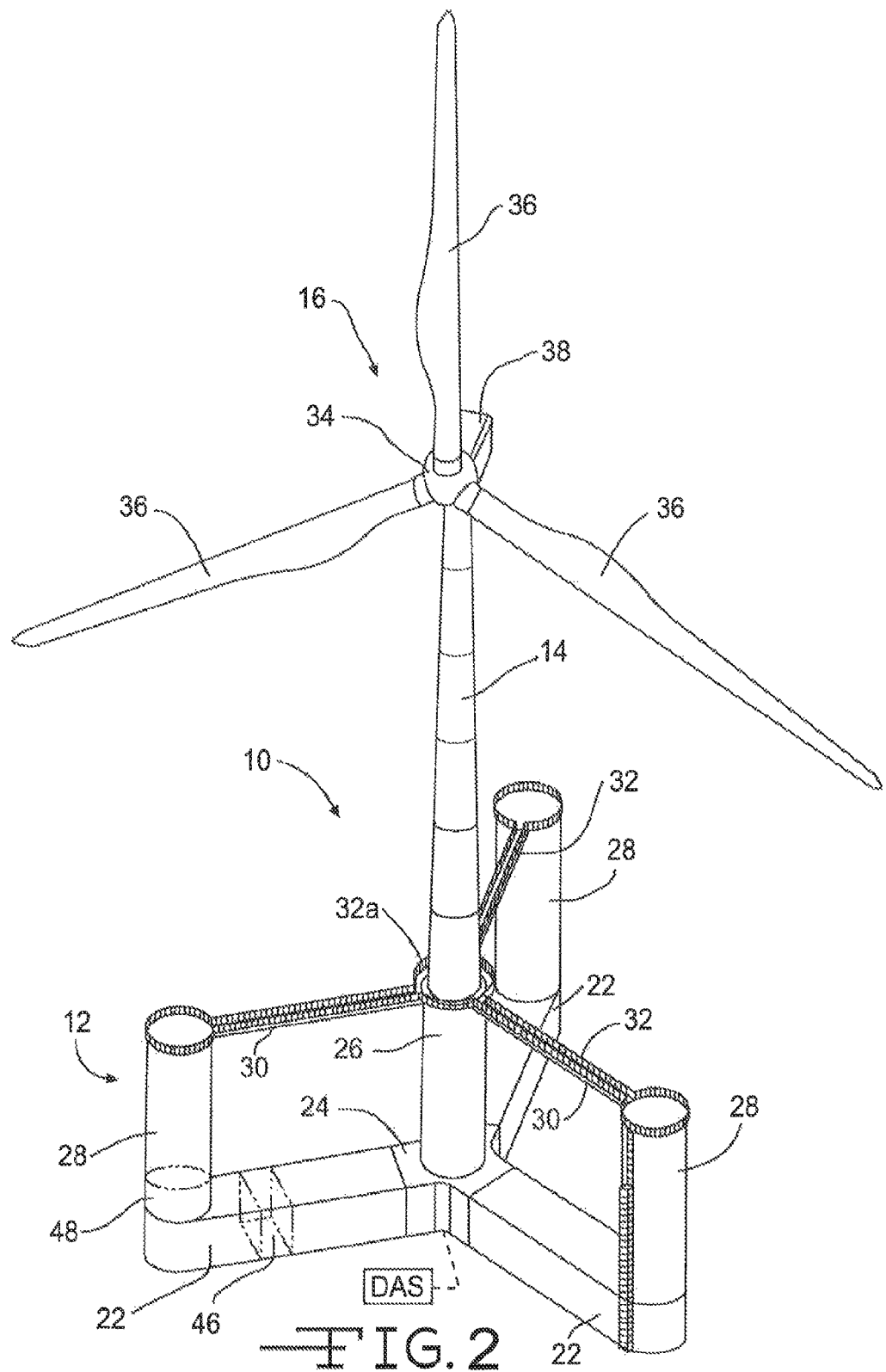
FIG. 2 is a perspective view of the improved floating wind turbine platform illustrated in FIG. 1.

As will be described in greater detail below, and best shown in FIG. 2, the illustrated foundation 12 is formed from three bottom beams 22 that extend radially outwardly from a keystone 24 and provide buoyancy. An interior or center column 26 is mounted to the keystone 24, and three outer columns 28 are mounted at or near the distal ends of the bottom beams 22. The center column 26 and outer columns 28 extend upwardly and perpendicularly to the bottom beams 22 and also provide buoyancy. Additionally, the center column 26 supports the tower 14. Radial support or top beams 30 are connected to the center column 26 and each of the outer columns 28. The tower 14 is mounted to the center column 26. If desired, catwalks 32 may be attached to each top beam 30. Each catwalk 32 may be connected by a connecting catwalk 32a mounted around all or a portion of a base of the tower 14. In FIG. 2, a portion of the catwalk 32 on one top beam 30 has been removed for clarity.

In the embodiments illustrated herein, the wind turbine 16 is a horizontal-axis wind turbine. Alternatively, the wind turbine may be a vertical-axis wind turbine, such as shown at 16' in FIG. 1A. The size of the turbine 16 will vary based on the wind conditions at the location where the floating wind turbine platform 10 is anchored and the desired power output. For example, the turbine 16 may have an output of about 5 MW. Alternatively, the turbine 16 may have an output within the range of from about 1 MW to about 10 MW.

The wind turbine 16 includes a rotatable hub 34. At least one rotor blade 36 is coupled to and extends outward from the hub 34. The hub 34 is rotatably coupled to an electric generator (not shown). The electric generator may be coupled via a transformer (not shown) and an underwater power cable 37 to a power grid (not shown). In the illustrated embodiment, the rotor has three rotor blades 36. In other embodiments, the rotor may have more or less than three rotor blades 36. A nacelle 38 is attached to the wind turbine 16 opposite the hub 34.

Figure 3:
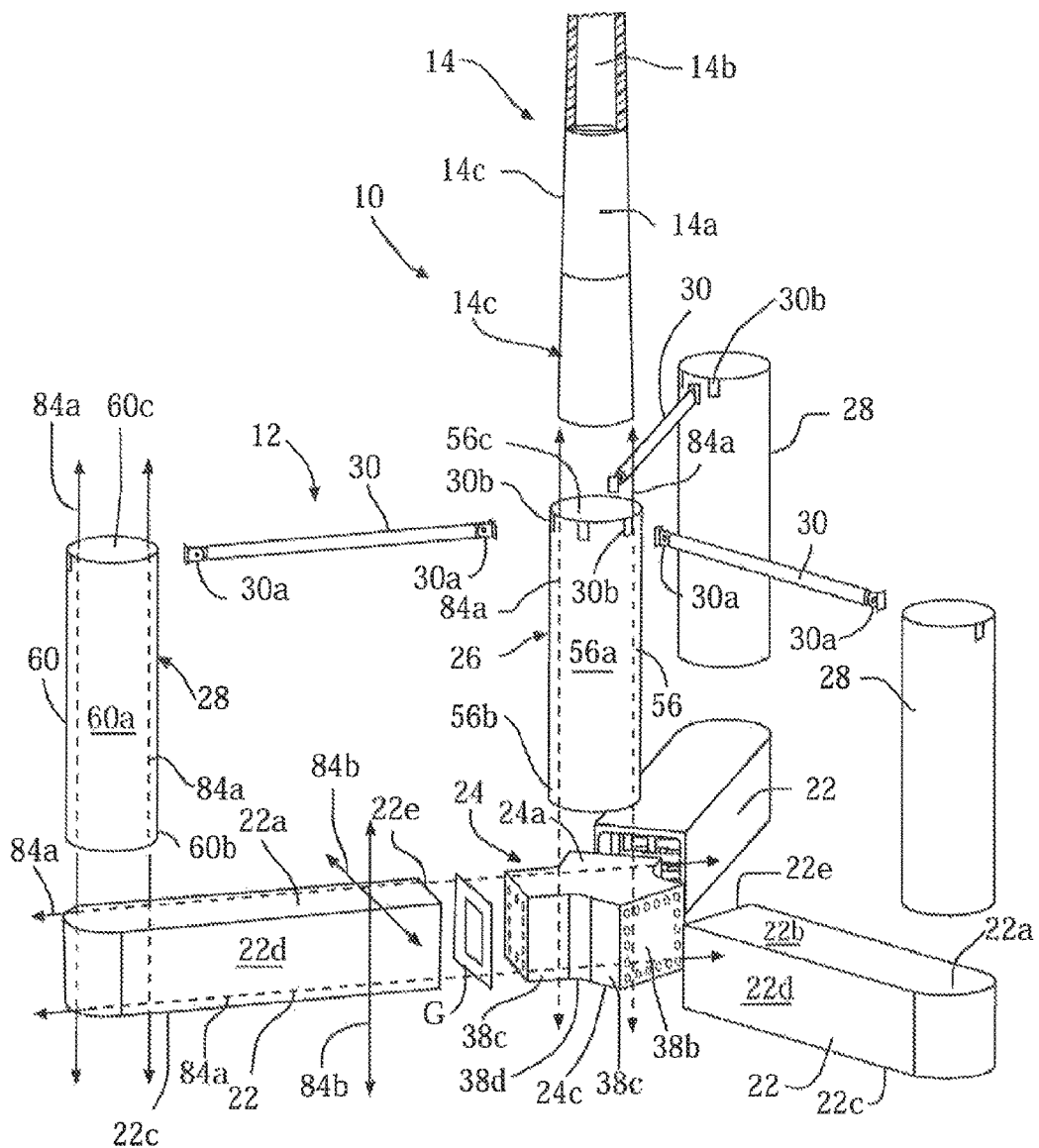
FIG. 3 is an exploded perspective view of the improved floating wind turbine platform illustrated in FIGS. 1 and 2.

As shown in FIGS. 3 and 6, the keystone 24 includes an upper wall 24a defining an upper surface 24b, a lower wall 24c, and further defines a central portion 24d with three radially outwardly extending legs 38. Each leg 38 includes an end wall 38a defining a substantially vertical connection face 38b to which the bottom beams 22 will be attached, and opposing side walls 38c. A substantially vertical transition wall 38d extends between the side walls 38c of adjacent legs 38.

Figure 5:
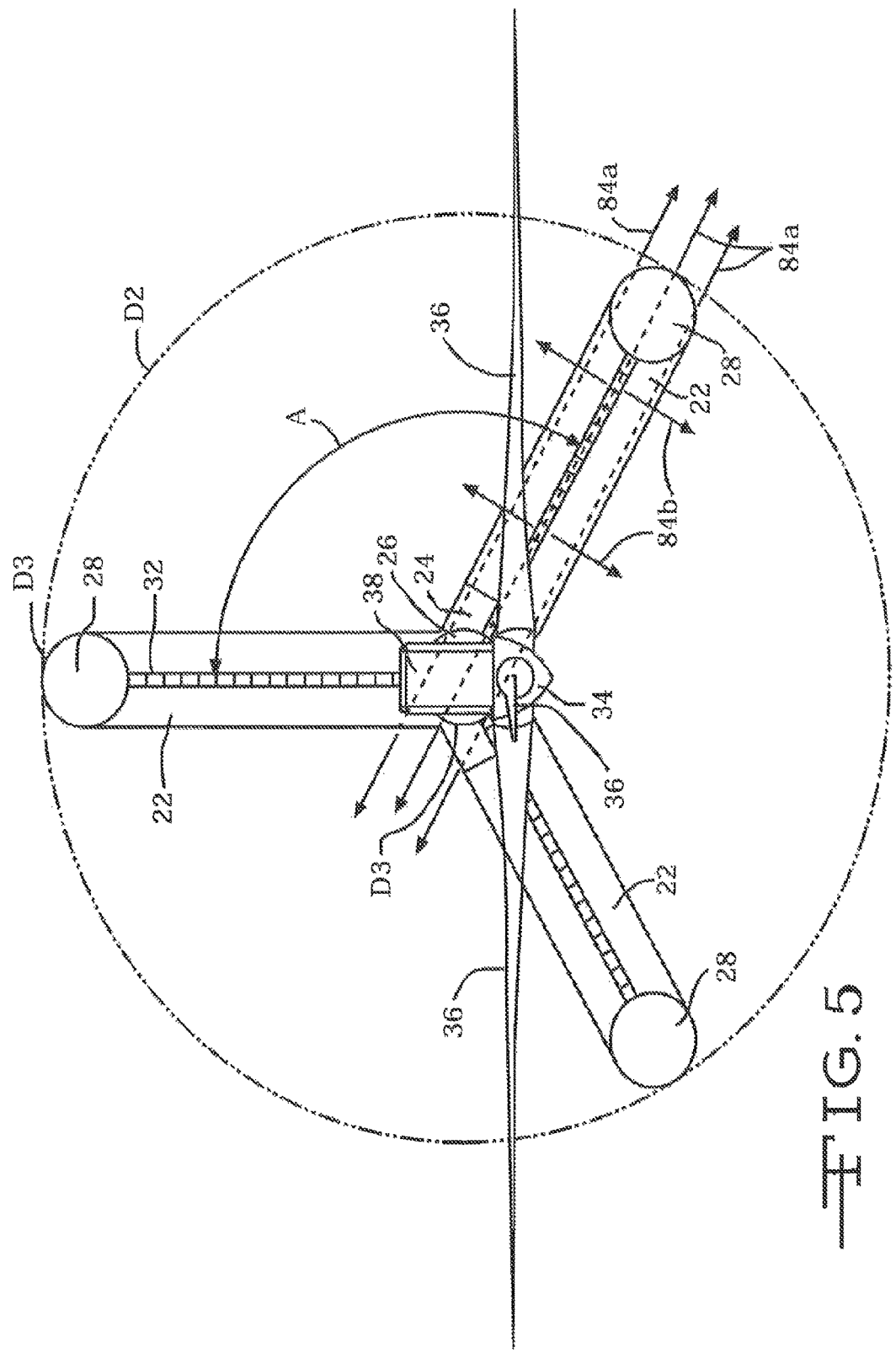
FIG. 5 is a top plan view showing the dimensions of the embodiment of the improved floating wind turbine platform illustrated in FIG. 4.

In the illustrated embodiment of the keystone 24, three legs 38 are formed such that the angle between axially extending centerlines of adjacent legs 38 is an angle A of about 120 degrees, as shown in FIG. 5. Alternatively, the keystone 24 may include four or more legs for the attachment of four or more bottom beams 22.

The keystone 24 includes a plurality of first ducts 76a extending from the connection face 38b, through the side walls 38c toward an interior of the keystone 24. These ducts 76a are axially aligned with first ducts 78a formed transversely through the side walls 38c on a side of the keystone 24 opposite each leg 38. Similarly, a plurality of second ducts 76b extends from the connection face 38b, through the upper wall 24a and the lower wall 24c toward an interior of the keystone 24. The second ducts 76b are axially aligned with second ducts 78b formed transversely through the side walls 38c and the transition wall 38d on a side of the keystone 24 opposite the leg 38.

The illustrated keystone 24 is formed from pre-stressed reinforced concrete, and may include an internal central cavity. Each leg 38 may also include an internal leg cavity. Any desired process may be used to manufacture the keystone 24, such as a spun concrete process or conventional concrete forms. Alternatively, other processes such as those used in the precast concrete industry may also be used. The concrete of the keystone 24 may be reinforced with any conventional reinforcement material, such as high tensile steel cable and high tensile steel reinforcement bars or REBAR. Alternatively, the keystone 24 may be formed from FRP, steel, or combinations of pre-stressed reinforced concrete, FRP, and steel.

As best shown in FIGS. 3 and 6, each bottom beam 22 includes a upper wall 22a defining an upper surface 22b, a lower wall 22c, opposing side walls 22d, a first end wall 22e, which will be connected to the vertical connection face 38b of the keystone 24, and a semi-cylindrical second end wall 22f. Like the keystone 24, the illustrated bottom beams 22 are formed from pre-stressed reinforced concrete as described above. Alternatively, the bottom beams 22 may be formed from FRP, steel, or combinations of pre-stressed reinforced concrete, FRP, and steel.

As illustrated schematically in FIG. 2, one or more first ballast chambers 46 may be formed in each bottom beam 22. Also, one or more second ballast chambers 48 may be formed in each outer column 28.

Referring again to FIG. 3, the center column 26 includes a cylindrical side wall 56 having an outer surface 56a, a first axial end 56b, a second axial end wall 56c, and defines a hollow interior space. Similarly, the outer columns 28 include a cylindrical side wall 60 having an outer surface 60a, a first axial end 60b, a second axial end wall 60c, and define a hollow interior space. Like the keystone 24 and the bottom beams 22, the illustrated center column 26 and the outer columns 28 are formed from pre-stressed reinforced concrete as described above. Alternatively, the center column 26 and the outer columns 28 may be formed from FRP, steel, or combinations of pre-stressed reinforced concrete, FRP, and steel.

The illustrated floating composite wind turbine platform 10 includes three bottom beams 22 and three outer columns 28. It will be understood however, that the improved floating composite wind turbine platform 10 may be constructed with four or more bottom beams 22 and outer columns 28.

Referring again to FIG. 3, a method of post-tensioning the foundation 12 is illustrated. First tendons, represented by the arrows 84a, extend longitudinally through the side wall 56 of the center column 26 and through the keystone 24. Similarly, first tendons 84a extend longitudinally through the side wall 60 of each outer column 28 and through the bottom beams 22. First tendons 84a also extend longitudinally through one or more of the walls 22a, 22c, and 22d of the bottom beam 22 and through the keystone 24. Free ends of the first tendons 84a are secured to outside surfaces of the keystone 24, the bottom beams 22, the center column 26, and the outer columns 28 with a suitable fastener.

Once installed, the first tendons 84a are post-tensioned longitudinally, wherein the tendons 84a are stressed and suitably anchored. The tendons 84a want to return to their original lengths but are prevented from doing so by the anchors. Because the first tendons 84a are maintained in a permanently stressed; i.e., elongated, condition, they apply a compressive force on the concrete of the keystone 24 and the bottom beams 22, on the keystone and the center column, and on the bottom beams 22 and the outer columns 28. The compression that results from this post-tensioning counteracts tensile forces created by subsequent applied loading or moment applied to the floating wind turbine platform 10 by wind stress exerted on the tower 14 and the wind turbine 16.

Second tendons, represented by the arrows 84b, may extend through one or more of the walls 22a, 22c, and 22d of each of the bottom beams 22 in a direction perpendicular to an axis of the bottom beam 22. Free ends of the second tendons 84b may be tensioned and secured as described above.

In the embodiments illustrated herein, the post-tensioning tendons 84a and 84b are steel cables, such as high tensile steel cable. Alternatively, the post-tensioning tendons may be formed of any other high tensile strength material.

If desired, a sealing member such as a gasket G shown in FIG. 3, may be disposed between the keystone 24 and the bottom beams 22 to seal the connection therebetween. Non-limiting examples of suitable gasket material include neoprene, caulking, rubber, and other elastomers.

Referring to FIG. 3, the top beams 30 are configured as substantially axially loaded members and extend substantially horizontally between upper ends of the center column 26 and each outer column 28. In the illustrated embodiment, the top beams 30 are formed of tubular steel having an outside diameter of about 4 ft (1.2 m). Alternatively, the top beams 30 may be formed from FRP, pre-stressed reinforced concrete, or combinations of pre-stressed reinforced concrete, FRP, and steel. Each top beam 30 includes mounting brackets 30a at each end. The mounting brackets 30a are configured to be attached, such as be threaded fasteners, to attachment members 30b, such as steel plates, on the center column 26 and each outer column 28.

The top beams 30 are further designed and configured substantially not to resist the bending moment of the base of the tower 14, and do not carry a bending load. Rather, the top beams 30 receive and apply tensile and compressive forces between the center column 26 and the outer columns 28.

The illustrated top beams 30, formed of about 4 ft diameter steel, are lighter and thinner than similar beams formed from reinforced concrete. The use of relatively lighter and thinner top beams 30; i.e., axially loaded members, at the upper portion of the floating wind turbine platform 10 allows for the distribution of more relative weight at the bottom of the floating wind turbine platform 10 platform structure where it is needed most. The reduction in weight can be significant. For example, a concrete member weighing about 800,000 pounds may be replaced with a steel beam weighing about 70,000 pounds, thus also providing advantageous savings in material and construction cost.

In the illustrated embodiment, the tower 14 is tubular having an outer wall 14a defining a hollow interior space 14b, and may have any suitable outside diameter and height. In the illustrated embodiment, the outside diameter of the tower 14 tapers from a first diameter at its base to a second, smaller diameter at its upper end. The illustrated tower 14 is formed from fiber reinforced polymer (FRP) composite material. Non-limiting examples of other suitable composite materials include glass and carbon FRP. The tower may also be formed from a composite laminate material. Alternatively, the tower 14 may be formed from concrete or steel in the same manner as the components of the foundation 12, described in detail above.

The tower 14 may be formed in any number of sections 14c. Like the center and outer columns 26 and 28, the hollow interior space 14b of the tower may be sub-divided into one or more internal sections 94 by one or more floors 96. These internal sections 94 may be configured as rooms for equipment used in the operation of the wind turbine 16 and the floating composite wind turbine platform 10.

Advantageously, the tower 14 formed from composite material as described above will have reduced mass above a waterline WL relative to a conventional steel tower. Because the FRP composite tower 14 has reduced mass, the mass of the foundation 12, including any ballast, required below the water line WL to maintain stability of the floating wind turbine platform 10 may also be reduced. This will reduce the overall cost of the wind generating device.

Significantly, the material for floating wind turbine platform 10 and the tower 14 may be chosen to focus stronger, lighter materials in the upper portions of the foundation 12 and heavier materials in the lower portions of the foundation 12. As described in detail above, the keystone 24, the bottom beams 22, the center column 26, and the outer columns 28 may be formed from reinforced concrete, while the top beams 30 at the upper portion of the foundation 12 may be formed from steel. The tower 14, mounted to an upper end of the foundation 12, may be formed from FRP. In one exemplary embodiment, lower portions of the foundation 12, such as the keystone 24 and the bottom beams 22, are formed from a relatively higher density concrete, and upper portions of the foundation 12, such as the center and outer columns 26 and 28, respectively, are formed from relatively lower density concrete. Accordingly, the materials used to form the floating wind turbine platform 10 and the tower 14 have generally and substantially successively higher material strength-to-weight ratios from the bottom of the floating wind turbine platform 10 to the top of the tower 14, with the highest strength-to-weight ratio being at the top of the tower 14. A floating wind turbine platform 10 and tower 14 constructed in this manner will have a relatively low center of gravity.

It will be understood that the ballast chambers 46 and 48 may be fluidly connected by an active ballast system comprising a plurality of pipes and pumps (not shown). For example, such an active ballast system of pipes and pumps may connect all ballast chambers 46 and 48 together. Such a system may be used, for example, to shift ballast from one of the ballast chambers 48 in an outer column 28, or from one of the ballast chambers 46 in a bottom beam 22, to any of the other ballast chambers 46 and 48. In one embodiment, an active ballast system includes two 1200 gallon per minute pumps. It is estimated that such an active ballast system could adjust the vertical tipping of the tower by approximately 5 degrees over a half hour period of pumping. An active ballast system allows a reduction in structural loading of the floating wind turbine platform 10, thereby allowing the floating wind turbine platform 10 to have a smaller size relative to similar wind turbine platforms without such an active ballast system.

Additionally, the active ballast system allows for the selective addition and removal water from the ballast chambers 46 to maintain pitch and roll angles of the floating wind turbine platform 10 within preset design limits during all operational and environmental conditions and when any component of the floating wind turbine platform 10 or the wind turbine 16 is damaged. Although the ballast is described as being water, it will be understood that the ballast may be other suitable fluids, such as slurry. Suitable slurry may comprise particles of a dense material and water.

For example, slurry formed of calcium chloride and water may be used in lieu of water as ballast.

Figure 4:
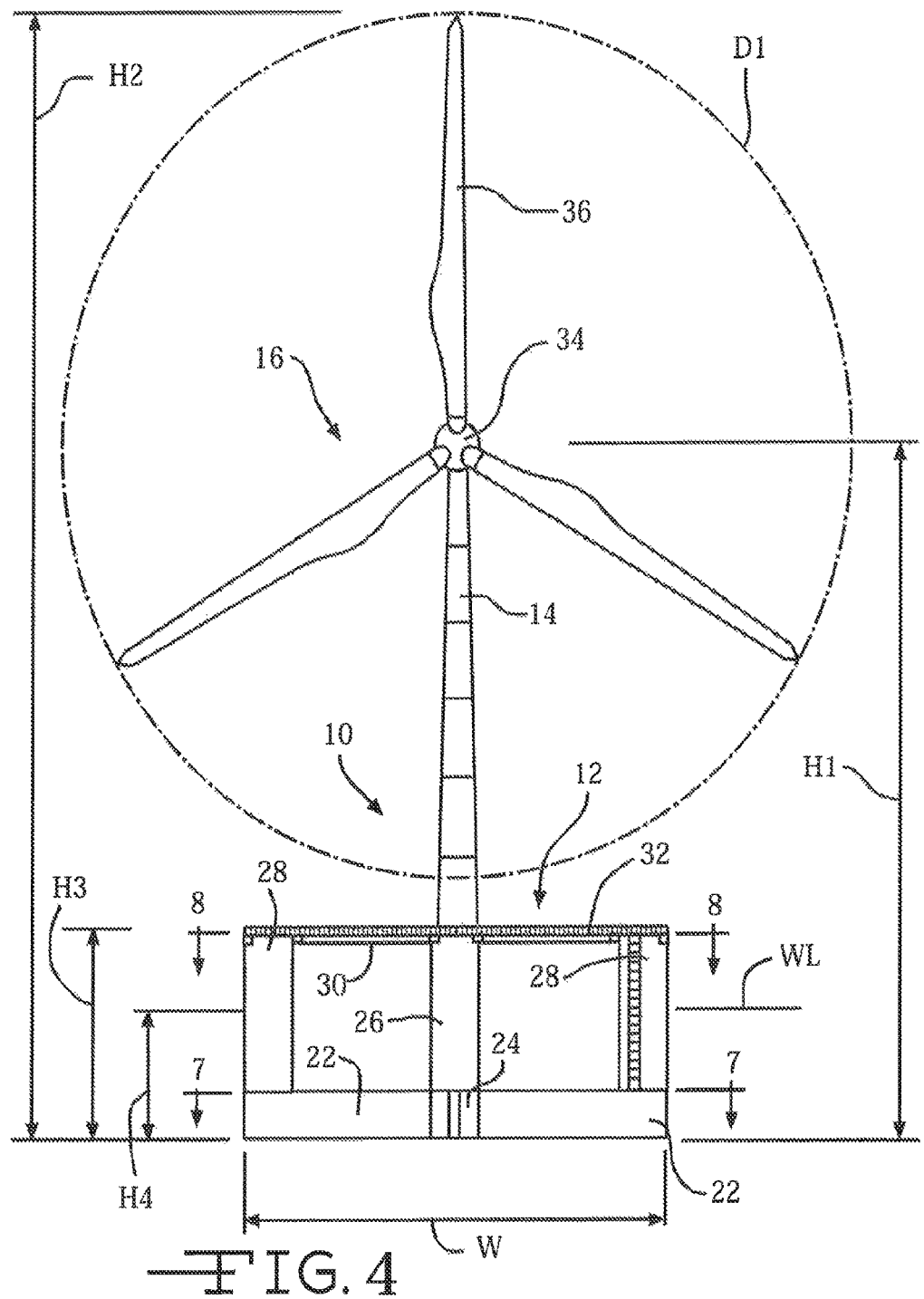
FIG. 4 is an elevational view showing the dimensions of one embodiment of the improved floating wind turbine platform illustrated in FIGS. 1 through 3.

Referring now to FIGS. 4 and 5, one embodiment of the floating wind turbine platform 10 is illustrated. In the embodiment illustrated in FIGS. 4 and 5, the turbine 16 has an output of about 6 MW, and a rotor diameter D1 of about 496 ft (about 151 m). To support such a turbine, the floating wind turbine platform 10 has an outside platform diameter D2 of about 301 ft (about 92 m), and a platform width W of about 265 ft (about 80 m). The outer columns 28 and the center column 26 each have an outside diameter D3 of about 30 ft (about 9 m). The floating wind turbine platform 10 has a height H1 from the bottom of the bottom beams 22 to a center of the hub 34 of about 329 ft (about 100 m) and a maximum height H2 from the bottom of the bottom beams 22 to a distal end of a rotor blade 36 (when the rotor blade is axially aligned with the tower 14) of about 642 ft (about 196 m). The foundation 12 has a height from the bottom of the bottom beams 22 to the top of the center and outer columns, 26 and 28, respectively, of about 115 ft (about 35 m). When deployed in a body of water, the floating wind turbine platform 10 illustrated in FIGS. 4 and 5 has a draft H4 of about 66 ft (about 20 m).

It will be understood that the size and dimensions of each component of the improved floating wind turbine platform 10 described herein will vary with the size of the supported turbine 16 and the environmental conditions in the location where the improved floating wind turbine platform 10 will be deployed.

In a first embodiment of a method of assembling the improved floating wind turbine platform 10, the reinforced concrete keystone 24 and the bottom beams 22 are first formed in a dry dock or graving dock. The bottom beams 22 are then post-tensioned into the keystone as described above. The dry or graving dock is then flooded so that the assembly comprising the keystone 24 and the bottom beams 22 floats. The keystone 24 and bottom beams 22 assembly is moved to a dock or pier-side assembly area with sufficient draft so that the assembly remains afloat during the assembly of the remaining components of the floating wind turbine platform 10.

The center column 26 and the outer columns 28 are then formed in place on the keystone 24 and the bottom beams 22, respectively. The center column 26 and outer columns 28 may be formed in sections or in one forming operation by any desired concrete forming method. Once formed, the center column 26 and the outer columns 28 are then post-tensioned to the keystone 24 and the bottom beams 22, respectively, as described above. The axially loaded top beams 30 are then installed, followed by the tower 14 and the turbine 16, thus defining a floating wind turbine platform assembly.

Once fully assembled, the floating wind turbine platform 10, with the tower 14 and the turbine 16 mounted thereon, may be towed out of the dry or graving dock to the location where it will be moored. During towing, and/or upon arrival at its moored location, the ballast chambers 46 and 48 may be filled with water. The floating wind turbine platform 10 is then attached to its mooring lines 18, which are pre-secured to the seabed S. The floating wind turbine platform 10 is then attached to an underwater power cable 37, as described above.

In a second embodiment of a method of assembling the improved floating wind turbine platform 10, the reinforced concrete keystone 24 and the bottom beams 22 are first formed in a dry dock or graving dock. The bottom beams 22 are then post-tensioned into the keystone as described above. The center column 26 and the outer columns 28 are then formed in place on the keystone 24 and the bottom beams 22, respectively. The center column 26 and outer columns 28 may be formed in sections or in one forming operation by any desired concrete forming method. Once formed, the center column 26 and the outer columns 28 are then post-tensioned to the keystone 24 and the bottom beams 22, respectively, as described above. The axially loaded top beams 30 are then installed, followed by the tower 14 and the turbine 16.

The dry or graving dock is then flooded so that the floating wind turbine platform 10, with the tower 14 and the turbine 16 mounted thereon, floats. The floating wind turbine platform 10, with the tower 14 and the turbine 16 mounted thereon, may be towed out of the dry or graving dock to the location where it will be moored. During towing, and/or upon arrival at its moored location, the ballast chambers 46 and 48 may be filled with water. The floating wind turbine platform 10 is then attached to its mooring lines 18, which are pre-secured to the seabed S. The floating wind turbine platform 10 is then attached to an underwater power cable 37, as described above.

During normal operation of the improved floating wind turbine platform 10 and its attached wind turbine 16, system maintenance, turbine 16 repair, or turbine 16 replacement may be required. In a first embodiment of a method of maintaining, repairing, or replacing any portion of the improved floating wind turbine platform 10 and its attached wind turbine 16, the floating wind turbine platform 10 is detached from its mooring lines 18 and its underwater power cable 37. The floating wind turbine platform 10 may then be towed to a dock or pier-side repair area. During towing, and/or upon arrival at the dock or pier-side repair area, a pre-determined amount of ballast water is removed from the ballast chambers 46 and 48. The required maintenance, repair, or replacement of parts then occurs at the dock or pier-side repair area. The floating wind turbine platform 10 may then be prepared and again towed to a location where it will be moored. During towing, and/or upon arrival at its moored location, the ballast chambers 46 and 48 may be re-filled with water. The floating wind turbine platform 10 is then attached to its mooring lines 18, and attached to an underwater power cable 37, as described above.

For operational control and monitoring, the floating wind turbine platform 10 and may include an active control system, such a Supervisory Control and Data Acquisition (SCADA) system that reduces one or more of load, acceleration, mean pitch and roll angles, and fatigue stresses throughout the floating wind turbine platform 10, the tower 14 and the turbine 16 to optimize energy output, and maintain operation if the floating wind turbine platform 10 is damaged. The floating wind turbine platform 10 includes a plurality of sensors that sense various environmental conditions, such as wind speed and variability, and operational conditions, such as platform pitch, strain of various structural components, and acceleration of the floating wind turbine platform 10. The pitch of the turbine blades may be adjusted to compensate for the various sensed parameters to mitigate undesirable loading. For example, the turbine speed may be adjusted and the turbine blade pitch can be controlled to maximize power. These adjustments may be controlled by a controller, which may include a computer having an algorithm.

Performance and environmental data, described in detail below, is collected at various locations or data boxes in the floating wind turbine platform 10, the tower 14 and the turbine 16 and routed through a series of chips, processors, or computers to a data acquisition system (DAS) located on the floating wind turbine platform 10. Alternatively, the DAS may be located remotely from the floating wind turbine platform 10 and may receive data through a wireless signal or via an underwater cable.

In the illustrated embodiment, the data boxes are located in the hub 34, the nacelle 38, at the top of the tower 14, at the base of the tower 14, and in the foundation 12. It will be understood that the floating wind turbine platform 10 may include data boxes in any one or more of these locations. Data from the hub 34 is transmitted through slip rings (not shown, but located between the turbine 16 and the nacelle 38 in a conventional manner, to the data box in the nacelle 38. Data is further transmitted from data boxes in the nacelle 38, at the top of the tower 14, and in the foundation 14, to the data box at base of the tower 14, and then to the DAS.

In addition to the onboard sensors, sensors may be mounted on adjacent floating wind turbine platforms 10, and on buoys B remote from the floating wind turbine platform 10. Data from these remote sensors may be transmitted to the DAS through a wireless signal or via an underwater cable. Thus, the DAS may receive input from sensors from any desired number of floating wind turbine platforms 10 and any number of remote sensors.

Examples of remote sensors that may be used with the improved floating wind turbine platform 10 include a buoy equipped with Light Detection and Ranging (LIDAR), and a buoy equipped with a camera, GPS, and a variety of meteorological and environmental sensors, such as to detect wind speed, wind direction, skin temperature, humidity, air pressure, buoy translation and rotation, wave height, wave direction, wave period, current profile, water salinity and conductivity, and buoy translation and rotation.

In a first embodiment of a method of operating and controlling one or more floating wind turbine platforms 10, the data box in the hub 34 receives data from an optical interrogator, and/or sensors which detect blade bending, blade torsion, blade pitch, and blade pitch actuation strain.

The data box in the nacelle 38 receives data from nacelle sensors, ambient condition sensors, and turbine sensors. The nacelle sensors may include sensors which detect rotor speed, rotor position, rotor torque, turbine real power, generator air gap, generator speed, nacelle position, and tower top translation and rotation. The ambient condition sensors may include sensors which detect free stream wind speed, wake wind speed, relative humidity, pressure, temperature, wind speed, and wind direction. The turbine sensors may include sensors which detect real power, grid conditions, brake status, blade pitch, wind speed, wind direction, and nacelle position.

The data box at the top of the tower 14 receives data from sensors which detect tower top acceleration, tower top bending, tower top torque, and tower top translation and rotation.

The data box at the base of the tower 14 receives data from sensors which detect tower base acceleration, tower base bending, tower base translation and rotation, mid-tower bending, and tower base and foundation 12 translation strain.

The data box in the foundation 12 receives data from sensors which detect one of more of foundation 12 translation and rotation, foundation 12 bending, mooring line 18 strain, tension bar corrosion, and tension bar strain. Additionally, the data box in the foundation 12 receives ambient condition data, including water level, wind profile, ballast water level, temperature, and data from any on-board cameras.

In a second embodiment of a method of operating and controlling one or more floating wind turbine platforms 10, the data box in the nacelle 38 may alternatively receive data from nacelle sensors, ambient condition sensors, and turbine sensors, wherein the nacelle sensors may include sensors which detect rotor speed, rotor position, rotor torque, generator air gap, generator speed, and nacelle position. The ambient condition sensors may alternatively include sensors which detect free stream wind speed, relative humidity, pressure, temperature, wind speed, and wind direction. The turbine sensors may include sensors which detect real power, grid conditions, brake status, blade pitch, wind speed, wind direction, and nacelle position.

In the second embodiment of a method of operating and controlling one or more floating wind turbine platforms 10, the data box in the foundation 12 may alternatively receive ambient condition data, including water level, ballast water level, temperature, and data from any on-board cameras.

As described, the active control system reduces one or more of load, acceleration, mean pitch and roll angles, and fatigue stresses throughout the floating wind turbine platform 10, the tower 14 and the turbine 16 to optimize energy output, and maintain operation if the floating wind turbine platform 10 is damaged. In addition, the pipes 102, pumps 104, and ballast chambers 46 and 48 may be used to maintain the pitch and roll angles of the floating wind turbine platform 10 within preset design limits during all operational and environmental conditions and when any component of the floating wind turbine platform 10 or the wind turbine 16 is damaged. Specifically, pipes 102, pumps 104, and ballast chambers 46 and 48 may be used to move ballast water to keep the floating wind turbine platform 10, the tower 14 and the turbine 16 vertical.

Further, the active control system may be used with the turbine pitch control and turbine generator speed, to minimize stress and acceleration throughout the system.

The principle and mode of operation of the invention have been described in its preferred embodiments. However, it should be noted that the invention described herein may be practiced otherwise than as specifically illustrated and described without departing from its scope.

What is claimed is:

1. A semi-submersible wind turbine platform capable of floating on a body of water and supporting a wind turbine, the semi-submersible wind turbine platform comprising:
   a keystone;
   at least three bottom beams extending radially outward of the keystone, each bottom beam having an upper wall, a lower wall and opposing side walls, the walls defining a hollow chamber within each bottom beam, each bottom beam defining a buoyant member;
   a center column extending perpendicularly from an upper surface of the keystone, a first axial end of the center column attached to the keystone, the center column configured to have a tower attached to a second axial end thereof;
   outer columns, one of which extends perpendicularly from an upper surface of each bottom beam, first axial ends of the outer columns attached to a distal end of each bottom beam; and
   top beams, one of which extends between a second axial end of each outer column and a second axial end of the center column, the top beams configured substantially not to resist bending moment of a tower attached to the center column.

2. The semi-submersible wind turbine platform according to claim 1, wherein the top beams are formed of steel.

3. The semi-submersible wind turbine platform according to claim 1, wherein the top beams are formed from pre-stressed reinforced concrete or fiber reinforced polymer.

4. The semi-submersible wind turbine platform according to claim 1, wherein the keystone, the bottom beams, the center column, and the outer columns are formed from pre-stressed reinforced concrete.

5. The semi-submersible wind turbine platform according to claim 1, wherein the keystone, the bottom beams, the center column, the outer columns, and the top beams define a foundation, and wherein materials used to form the foundation have substantially successively higher material strength-to-weight ratios from a bottom of the foundation to a top of the foundation.

6. The semi-submersible wind turbine platform according to claim 1, further including a tower coaxially mounted to the center column, the tower formed from fiber reinforced polymer and is configured to support a wind turbine.

7. The semi-submersible wind turbine platform according to claim 6, wherein the keystone, the bottom beams, the center column, and the outer columns are formed from reinforced concrete and the top beams are formed from steel, such that material with the highest strength-to-weight ratio is at a top of the tower, and the foundation has a relatively low center of gravity.

8. The semi-submersible wind turbine platform according to claim 7, wherein the keystone and the bottom beams are formed from a relatively higher density concrete, and the center and outer columns are formed from relatively lower density concrete.

9. The semi-submersible wind turbine platform according to claim 1, wherein each bottom beam is longitudinally post-tensioned to the keystone.

10. The semi-submersible wind turbine platform according to claim 1, wherein each outer column is longitudinally post-tensioned to the bottom beam to which it is attached.

11. The semi-submersible wind turbine platform according to claim 1, wherein the center column is longitudinally post-tensioned to the keystone.

12. The semi-submersible wind turbine platform according to claim 1, wherein a ballast chamber is formed in each bottom beam.

13. The semi-submersible wind turbine platform according to claim 1, wherein a ballast chamber is formed in each outer column.

14. The semi-submersible wind turbine platform according to claim 1, wherein the top beams define axially loaded members.

15. The semi-submersible wind turbine platform according to claim 1, wherein each outer column is connected within the semi-submersible wind turbine platform only through the bottom beam and the top beam.

16. A method of assembling a semi-submersible wind turbine platform, the method comprising:
forming a reinforced concrete keystone and a plurality of reinforced concrete bottom beams in a dry dock, wherein each bottom beam has an upper wall, a lower wall and opposing side walls, the walls defining a hollow chamber within each bottom beam, each bottom beam defining a buoyant member;
post-tensioning the bottom beams into the keystone to define a beam assembly;
flooding the dry dock so that the beam assembly floats;
moving the floating beam assembly to an assembly area;
forming a center column from reinforced concrete on the keystone;
forming an outer column from reinforced concrete on each bottom beam;
post-tensioning the center column to the keystone;
post-tensioning each outer column to its associated bottom beam;
attaching axially loaded top beams between each outer column and the center column;
attaching a tower to the center column;
attaching a wind turbine to the tower, thus defining a floating wind turbine platform assembly;
towing the floating wind turbine platform assembly from the dry dock to a location where it will be moored;
filling ballast chamber in one or both of the outer columns and the bottom beams;
upon arrival at its moored location, attaching the floating wind turbine platform assembly to mooring lines which are pre-secured to the seabed; and
attaching the floating wind turbine platform assembly to an underwater power cable.

17. A semi-submersible wind turbine platform capable of floating on a body of water and supporting a wind turbine, the semi-submersible wind turbine platform comprising:
a foundation;
a tower attached to the foundation;
a wind turbine attached to the tower; and
an active control system having a data acquisition system (DAS);
wherein the DAS receives sensed environmental data, and receives sensed operational condition data of components the foundation, the tower, and the wind turbine;
wherein the sensed environmental data and the sensed operational condition data is received from onboard and remote sensors, and
wherein the DAS changes operating parameters of any of the foundation, the tower, and the wind turbine based on the environmental data and operational condition data received.

18. The semi-submersible wind turbine platform according to claim 17, wherein the DAS receives sensed operational condition data from onboard data processors located in one or more of the hub, the nacelle, an upper portion of the tower, a lower portion of the tower, and the foundation.

19. The semi-submersible wind turbine platform according to claim 18, wherein the DAS processes the sensed data to adjust operational parameters to at least one of optimize turbine power output, reduce structural loading, and change ballast volumes to change foundation pitch and roll angles.

20. The semi-submersible wind turbine platform according to claim 17, wherein the DAS receives sensed environmental data, and sensed operational condition data of components the foundation, the tower, and the wind turbine from one or more remotely located wind turbine platforms; and wherein the DAS processes the data from the one or more remotely located wind turbine platforms to adjust operational parameters to at least one of optimize turbine power output, reduce structural loading, and change ballast volumes to change foundation pitch and roll angles.

21. The semi-submersible wind turbine platform according to claim 17, wherein the remote sensors are located on one of another wind turbine platform and a buoy.

22. The semi-submersible wind turbine platform according to claim 17, wherein the sensed environmental data includes free stream wind speed and wake wind speed, thereby allowing the DAS to anticipate wind speed based on the free stream wind speed and wake wind speed data sensed.

* * * * *